(12) United States Patent
Sumler et al.

(10) Patent No.: US 8,353,406 B2
(45) Date of Patent: *Jan. 15, 2013

(54) SYSTEM, METHOD, AND COMPUTER READABLE MEDIUM FOR CREATING A VIDEO CLIP

(75) Inventors: Jason Sumler, Dallas, TX (US); Tomer Alpert, Dallas, TX (US)

(73) Assignee: Silver Screen Tele-Reality, Inc., Dallas, TX (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/979,410

(22) Filed: Dec. 28, 2010

(65) Prior Publication Data

US 2011/0093608 A1    Apr. 21, 2011

Related U.S. Application Data

(63) Continuation of application No. 11/293,005, filed on Dec. 2, 2005, now Pat. No. 7,882,258, which is a continuation-in-part of application No. 10/773,130, filed on Feb. 5, 2004, now abandoned.

(60) Provisional application No. 60/632,410, filed on Dec. 2, 2004, provisional application No. 60/445,261, filed on Feb. 5, 2003.

(51) Int. Cl.
*G06F 13/00* (2006.01)
(52) U.S. Cl. ...................................................... 209/231
(58) Field of Classification Search .................... 709/231
See application file for complete search history.

(56) References Cited

U.S. PATENT DOCUMENTS

| | | | |
|---|---|---|---|
| 4,685,003 | A | 8/1987 | Westland |
| 4,888,648 | A | 12/1989 | Takeuchi et al. |
| 4,937,685 | A | 6/1990 | Barker et al. |
| 5,012,334 | A | 4/1991 | Etra |
| 5,500,936 | A | 3/1996 | Allen et al. |
| 5,555,098 | A | 9/1996 | Parulski |
| 5,636,073 | A | 6/1997 | Yamamoto et al. |
| 5,664,227 | A | 9/1997 | Mauldin et al. |
| 5,782,692 | A | 7/1998 | Stelovsky |
| 5,786,814 | A | 7/1998 | Moran et al. |
| 5,969,716 | A | 10/1999 | Davis et al. |
| 5,996,015 | A | 11/1999 | Day et al. |
| 6,046,734 | A | 4/2000 | Noguchi et al. |
| 6,072,480 | A | 6/2000 | Gorbet et al. |
| 6,188,398 | B1 | 2/2001 | Collins-Rector et al. |

(Continued)

OTHER PUBLICATIONS

John David N. Dionisio and Alfonso F. Cardenas, "A Unified Data Model for Representing Multimedia, Timeline, and Simulation Data", Abstract, IEEE Transactions on Knowledge and Data Engineering, vol. 10, No. 5, Sep./Oct. 1998.

(Continued)

*Primary Examiner* — Robert B Harrell

(57) ABSTRACT

A system, method, and computer readable medium for creating a video clip comprises receiving still image files by a first module, creating a copy of a still image from the still image files with reduced dimensions by the first module, creating a new still image from a selected area of the still image, storing the new still image and the copy of the still image with a unified file name, ordering the stored images, creating an audio file by at least one of a second module and a third module, creating a timeline, by the first module, related to the ordered images and the created audio, and rendering the timeline into the video clip by a fourth module.

20 Claims, 16 Drawing Sheets

U.S. PATENT DOCUMENTS

| | | | |
|---|---|---|---|
| 6,195,503 | B1 | 2/2001 | Ikedo et al. |
| 6,249,280 | B1 | 6/2001 | Garmon et al. |
| 6,256,061 | B1 | 7/2001 | Martin et al. |
| 6,262,724 | B1 | 7/2001 | Crow et al. |
| 6,315,572 | B1 | 11/2001 | Owens et al. |
| 6,369,835 | B1 | 4/2002 | Lin |
| 6,414,686 | B1 | 7/2002 | Protheroe et al. |
| 6,571,051 | B2 | 5/2003 | Savoie |
| 6,646,655 | B1 * | 11/2003 | Brandt et al. ............. 715/723 |
| 6,961,954 | B1 | 11/2005 | Maybury et al. |
| 6,976,229 | B1 | 12/2005 | Balabanovic et al. |
| 7,039,643 | B2 | 5/2006 | Sena et al. |
| 7,124,366 | B2 | 10/2006 | Foreman et al. |
| 7,313,762 | B2 | 12/2007 | Bozdagi et al. |
| 7,725,812 | B1 | 5/2010 | Balkus et al. |
| 7,886,228 | B2 | 2/2011 | Balabanovic et al. |
| 8,087,054 | B2 | 12/2011 | Zacks et al. |
| 2001/0036356 | A1 | 11/2001 | Weaver et al. |
| 2002/0097327 | A1 | 7/2002 | Yamasaki |
| 2004/0001106 | A1 | 1/2004 | Deutscher et al. |
| 2004/0114904 | A1 * | 6/2004 | Sun et al. ............. 386/46 |
| 2004/0143673 | A1 | 7/2004 | Kristjansson |
| 2004/0257380 | A1 | 12/2004 | Herbert et al. |
| 2005/0240596 | A1 | 10/2005 | Worthen et al. |
| 2008/0292265 | A1 | 11/2008 | Worthen |
| 2008/0295130 | A1 | 11/2008 | Worthen |

OTHER PUBLICATIONS

Eihachiro Nakamae, Xueying Quin, Guofang Jiao, Przemyslaw Rokita, Katsumi Tadamura, Yuji Usagawa, "Computer Generated Still Images Composited with Panned Landscape Video Sequences", Abstract, Multimedia Modeling, 1998.

Jake Ludington, "Digital Lifestyle", Webpage, Ludington Media West, LLC., Aug. 23, 2011.

Andreas Girgensohn, John Boreczky, Lynn Wilcox, "Keyframe-Based User Interfaces for Digital Video", IEEE, Sep. 2001.

Don Collins, "Tips & Tricks for the Digital Nonlinear Editor", Videomaker, Your Guide to Creating and Publishing Great Video, Dec. 1998.

Horace J. Meng, Di Zhong, and Shih-Ful Chang, "Webclip: A WWW Video Editing/Browsing System", Abstract, IEEE, Department of Electrical Engineering, Columbia University, New York, NY 10027, USA, Multimedia Signal Processing, Jun. 23, 1997.

Windows Movie Maker, Jul. 25, 2012.

Civil Action No. 3:11-cv-02351-K, *Silver Screen Tele-Reality, Inc.*, v. *Dealer Impact Systems, L.L.C. Digital Motorworks, Inc., Liquidus Marketing, Inc., and Unity Works! LLC*, Plaintiff's First Amended Complaint for Patent Infringement, Jun. 29, 2012.

Civil Action No. 3:11-cv-02351-K, *Silver Screen Tele-Reality, Inc.*, v. *Dealer Impact Systems, L.L.C. Digital Motorworks, Inc., Liquidus Marketing, Inc., and Unity Works! LLC*, First Amended Answer and Counterclaims of Defendant Unity Works! LLC, Jul. 10, 2012.

Civil Action No. 3:11-cv-02351-F, *Silver Screen Tele-Reality, Inc.*, v. *Dealer Impact Systems, L.L.C. Digital Motorworks, Inc., Liquidus Marketing, Inc., and Unity Works! LLC*, Defendant Digital Motorworks, Inc.'s Answer and Counterclaims to the First Amended Complaint, Jul. 12, 2012.

Civil Action No. 3:11-cv-02351-F, *Silver Screen Tele-Reality, Inc.*, v. *Dealer Impact Systems, L.L.C. Digital Motorworks, Inc., Liquidus Marketing, Inc., and Unity Works! LLC*, Defendant Liquidus Marketing, Inc.'s Answer and Counterclaims to the First Amended Complaint, Jul. 12, 2012.

Civil Action No. 3:11-cv-02351-F, *Silver Screen Tele-Reality, Inc.*, v. *Dealer Impact Systems, L.L.C. Digital Motorworks, Inc., Liquidus Marketing, Inc., and Unity Works! LLC*, Defendant Dealer Impact Systems, LLC's Answer to First Amended Complaint, Jul. 13, 2012.

Civil Action No. 3:11-cv-02351-K, *Silver Screen Tele-Reality, Inc.*, v. *Dealer Impact Systems, L.L.C. Digital Motorworks, Inc., Liquidus Marketing, Inc., and Unity Works! LLC*, Amended Preliminary Invalidity Contentions for Liquidus Marketing, Inc., and Digital Motorworks, Inc., Jul. 26, 2012.

Civil Action No. 3:11-cv-02351-K, *Silver Screen Tele-Reality, Inc.*, v. *Dealer Impact Systems, L.L.C. Digital Motorworks, Inc., Liquidus Marketing, Inc., and Unity Works! LLC*, Defendant Unity Works!, LLC's Amended Invalidity Contentions, Jul. 26, 2012.

Civil Action No. 3:11-cv-02351-F, *Silver Screen Tele-Reality, Inc.*, v. *Dealer Impact Systems, L.L.C. Digital Motorworks, Inc., Liquidus Marketing, Inc., and Unity Works! LLC*, Dealer Impact Systems, L.L.C.'s Amended Invalidity Contentions, Jul. 26, 2012.

* cited by examiner

ND COMPUTER
SYSTEM, METHOD, AND COMPUTER READABLE MEDIUM FOR CREATING A VIDEO CLIP

CROSS-REFERENCE TO RELATED APPLICATIONS

The present invention is a continuation of and claims the benefit and priority of U.S. patent application Ser. No. 11/293,005, filed on Dec. 2, 2005, now U.S. Pat. No. 7,882,258 entitled System, Method, and Computer Readable Medium for Creating A Video Clip, which is related to and claims the benefit and priority of U.S. Provisional Patent Application Ser. No. 60/632,410, filed on Dec. 2, 2004, entitled Picture To Video (Pic-2-Vid) In Internet Commerce and which is a Continuation-In-Part of U.S. patent application Ser. No. 10/773,130, filed on Feb. 5, 2004, now abandoned entitled System And Method For Assembling And Distributing Multi-Media Output, which is related to and claims the benefit and priority of U.S. Provisional Patent Application Ser. No. 60/445,261 filed on Feb. 5, 2003, entitled System And Method For Generating A Unified File Name. The entire contents of each of the above noted patent applications are enclosed by reference herein.

BACKGROUND OF THE INVENTION

The present invention is generally related to video, and more specifically, to a system, method, and computer readable medium for creating a video clip. The transcoding of pictures to video is a known technique that includes U.S. Pat. No. 6,195,503 that describes the transformation of compressed images and audio into video. Also, video editing using server Internet tools, including the transcoding and rendering of pictures into video is known. However, a limitation exists for using pictures as a tool for Internet commerce. Almost all sites for selling and buying items on the Internet use simple pictures as the main tool for explaining, demonstrating and educating customers about these items. Pictures are simple to take and use. Further, pictures do not use complex editing tools and processing power and do not require a high level of expertise to either take, process, or deliver.

It would be very beneficial if improved systems, methods, and computer readable media are devised which allow better options to convey pertinent information while using the same pictures that are used today.

SUMMARY OF THE INVENTION

The present invention provides a system, method, and computer readable medium for creating a video clip. In one embodiment, a method for creating a video clip comprises receiving still image files by a first module, creating a copy of a still image from the still image files with reduced dimensions by the first module, creating a new still image from a selected area of the still image, storing the new still image and the copy of the still image with a unified file name, ordering the stored images, creating an audio file by at least one of a second module and a third module, creating a timeline, by the first module, related to the ordered images and the created audio, and rendering the timeline into the video clip by a fourth module.

In another embodiment, a system for creating a video clip comprises a web server adapted to receive one or more images, the web server adapted to create a copy of the images, the web server adapted to create one or more new images from one or more selected areas of the images, and the web server adapted to provide a unified file name to each of the new images and a unified file name to each of the copies of the images.

In a further embodiment, a computer readable medium comprises instructions for creating a copy of an image with reduced dimensions, creating a new image from a selected area of the copied image, storing the new image and the copy of the image with a unified file name, and creating a timeline related to the image, the new image, and to audio related to the image and to the new image, wherein the timeline is used to create a video clip.

DETAILED DESCRIPTION OF THE INVENTION

The present invention describes a process of creating video clips from any given set of digital pictures and of creating an audio track in either an automatic mode or a manual mode that is interchangeable. The pictures are provided as a set of Universal Resource Locators (URL's, pointing to one or more servers), uploaded manually or created on line by cropping and saving many pictures from one source. The audio track can be created from several sources including:

Interactive Voice Response (IVR)—using any telephone system the user can call into a computer based telephony application that calls a WMA encoder;

Text-To-Speech (TTS)—a TTS module can be used to convert text to speech;

Microphone—connected to a client device which records a voice file on the server; and Existing audio file—usually pre-recorded audio such as music or sound effects.

In manual mode, a preview module synchronizes a visual display (play-list) and an audio track for instant replay. a rendering server receives a command set (or SIS Commands) from a mixer or a predefined set of rules (in automatic mode) and creates a video file in .WMV format, for example. An embedded player recognizes the existence of the .WMV file and plays the video thus eliminating the need to post new HTML code.

Figure 1:
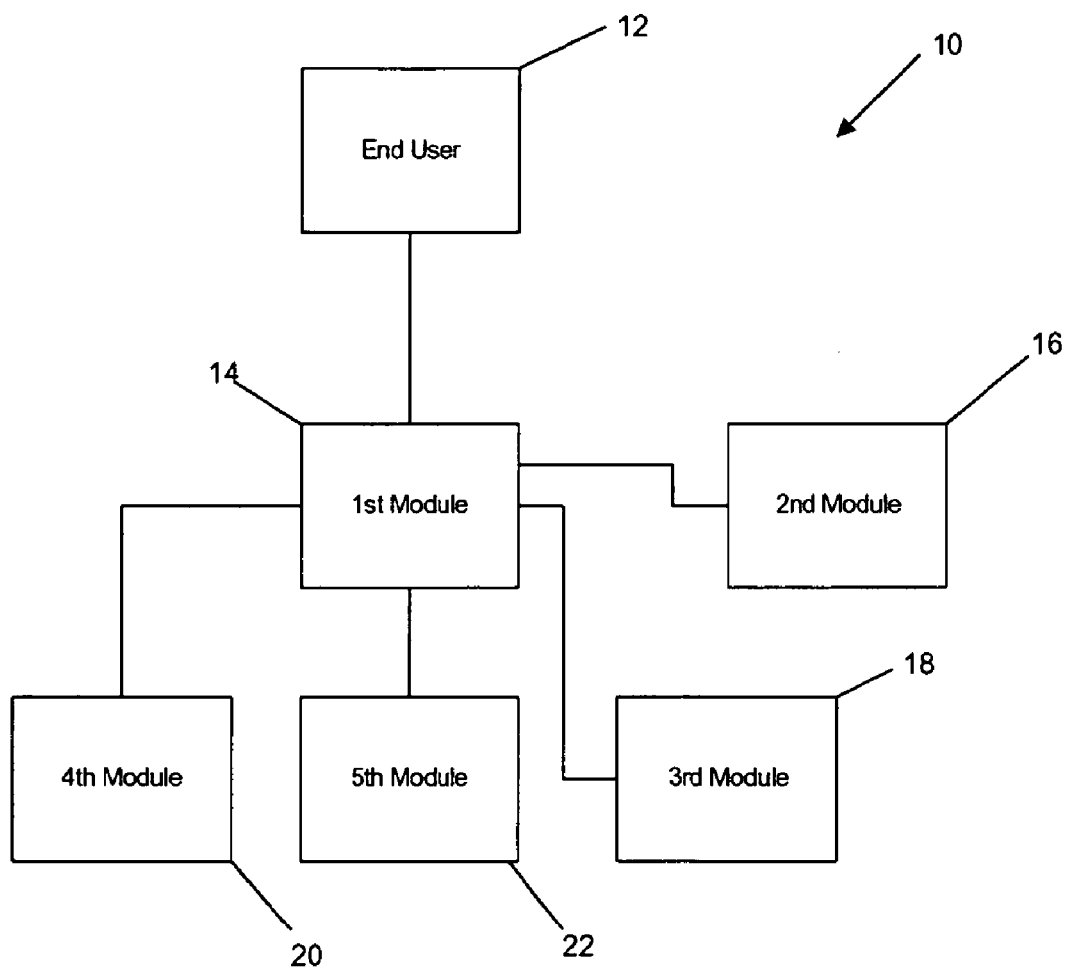
FIG. 1 depicts a system for creating a video clip in accordance with a preferred embodiment of the present invention.

The present invention further describes processing and delivering pictures made to video in a secure manner for use in commerce, such as for use in Internet commerce. Referring now to FIG. 1, a system 10 of the present invention comprises a first module (such as a web server 14), at least one of: a second module (such as a TTS engine) 16 and a third module (such as an IVR engine) 18, a fourth module (such as a rendering server) 20, a fifth module (such as a media steaming server) 22, and memory (not shown). The system 10 is accessed by a user device 12 such as a computer, cellular phone, and/or any wireless or wired device capable of communicating with the system 10. The user device 12 is coupled to the fist module 14, which is coupled to the second module and/or the third module directly or via the memory. The first module 14 is coupled to the fourth module 20 and is optionally coupled to the fifth module 22. In other embodiments, a lesser or greater number of modules can be used and the functionality performed by the current invention can be performed by these lesser or greater number of modules without departing from the scope of the present invention. Also, the connections between the modules may be wired, wireless, and a combination of wired and wireless.

Editing Process

Figure 5:
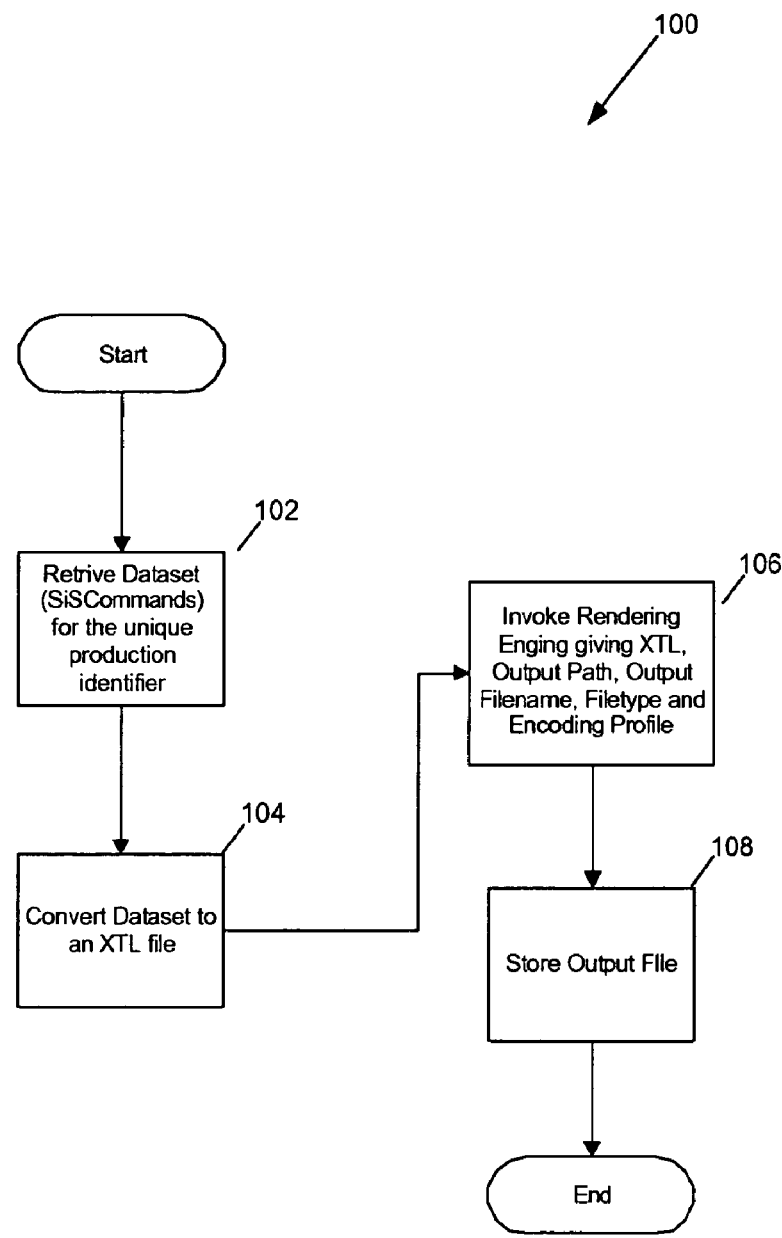
FIG. 5 depicts a transcoding/rendering process in accordance with a preferred embodiment of the present invention.

In one embodiment of the invention, the user uploads images (pictures), preferably in compressed format (such as JPEG) to a dedicated server for editing and transcoding from pictures and audio tracks to video, preferably WMV. A main portion of the invention is the editing process. Instead of transforming the pictures to video and then editing, the software of the present invention prepares (edits) the video using the original pictures and the original sound track (audio). This method allows for very simple editing that is extremely light in processing power. The editing process, as will be explained later, does not require the actual transcoding process to take place until the editing is completed and the editing instructions are summarized in a special command file (a SIS Command) using special command language. Instead of requiring several multiple servers dedicated to the editing process (because the requirement for processing power), the system uses fewer and lighter processing engines. This method also allows a streamlining of the transcoding process (transforming the pictures and associated audio to actual video). Once the user finishes editing the pictures and associated audio, the file containing the instructions on how to use the pictures and audio in the transcoding process are queued for the transcoding process. This achieves two main goals: (1) very efficient use of the transcoding engine, which typically requires most of the processing power, as files are processed only once, and (2) the files are queued (video encoding) in real time on their way to their final destination (the streaming server) as depicted in FIG. 5.

Figure 3:
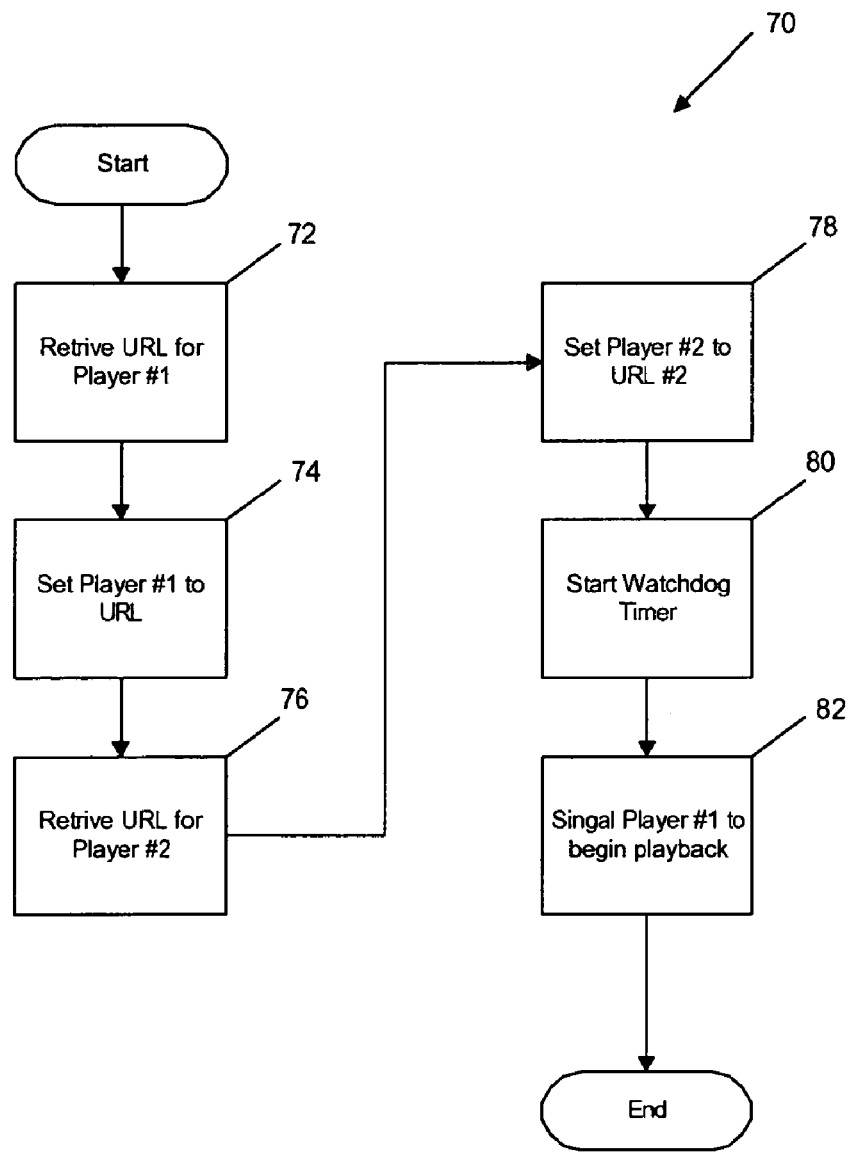
FIG. 3 depicts a flowchart for synchronization in accordance with a preferred embodiment of the present invention.
Figure 4:
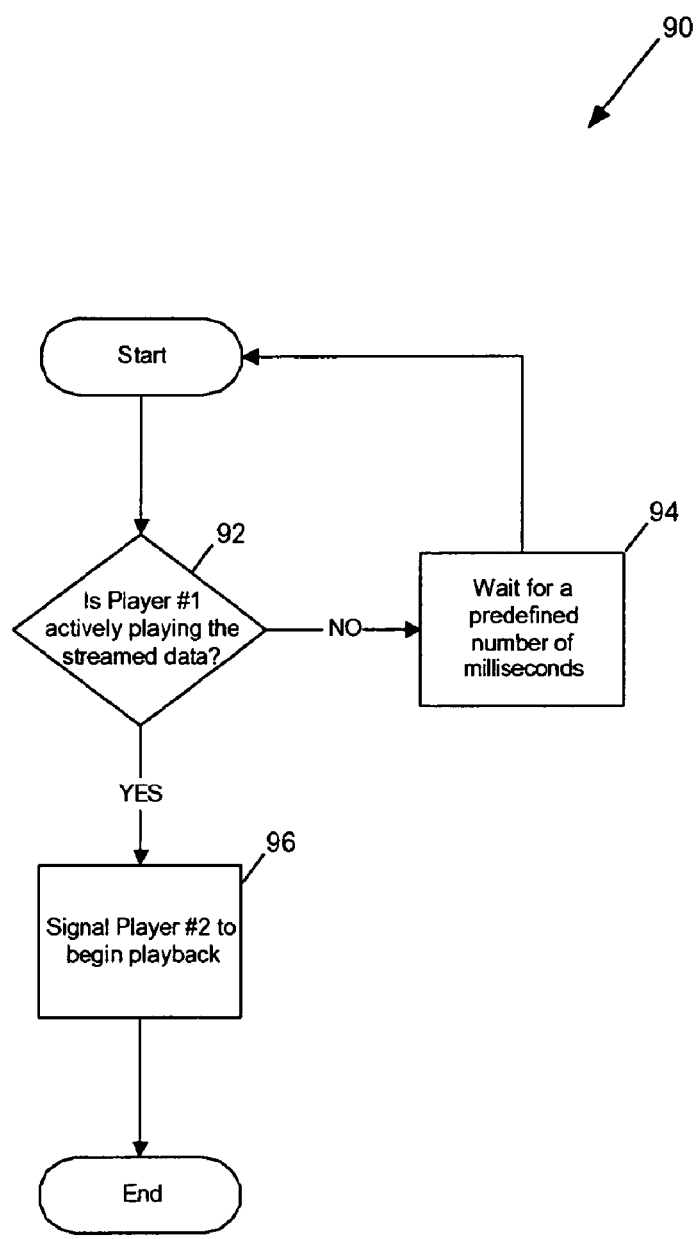
FIG. 4 depicts a timer process in accordance with a preferred embodiment of the present invention.

In one embodiment of the present invention, the system uses two players, one for audio and one for pictures. The editing process is premised on creating synchronization points between the two multimedia files (as depicted in FIGS. 3 and 4). In one instance, the pictures are displayed evenly in time according to the length of the audio file. For example, if there are 10 pictures to be transformed to video and the length of the audio file is 45 seconds, then each picture will be displayed for approximately 4.5 seconds. In another instance, the user (who created the video) can decide on different allocations of times to each picture based on the content of the audio file. This can be done either interactively (the user clicks the mouse for example when it desires a transition to the next picture) or by setting manually the time allocation—in percentages for example.

In another embodiment of the present invention, the audio track for the video is obtained using a telephone. The user calls a number, dials in an identification number of work in progress, and the server digitizes and compresses the incoming "audio track" in preparation for the editing process. In yet another variant of the invention, the audio track is uploaded from the user's computer where he/she digitizes the audio locally.

Text-To-Speech

In another embodiment of the invention, which can be used in many other applications (beyond Internet commerce), TTS is integrated into the system. This is important for both occasional users as well as aggregators (aggregators assist clients who are large sellers (Power Sellers) selling large quantities of items). The occasional user can benefit from TTS because it provides a professional sounding voice to the video (and the user can choose from a variety of voice options). The aggregator (and by extension his customers) can benefit from TTS because it can automatically create large amounts of sound tracks for many video clips (without the need for human interaction).

In a further embodiment of the invention, every picture has its associated TTS and the switch to a next picture is performed when the paragraph is over. In yet another embodiment of the current invention, the user can inject quiet periods when needed in order to keep a picture with short text on the screen longer. Likewise, the user can also include music or any other external audio clips to supplement the final video.

Focal Points

In yet another element of the present invention, the high resolution of available pictures allow the user to use a much higher quality video by using what are referred to as focal points. In many cases a single picture contains several objects that can be listed on sale. For example, a user may want to sell 10 tools and he created a single high resolution picture of all 10 tools. By using 10 focal points on the image (for example, selecting the focal points by clicks of the mouse), the software of the current invention can create the following: (1) 10 different pictures, and (2) a "real" video in which the "camera" is fluidly moving from one object to the next. This is especially useful when there are connections from one object to the next. A user can add pop-up messages and possibly associated text to help in the "selling" process. Such type of pop-up windows can create the mood for the visualization (add humor) or put a special slant on the object that is easier to do with a pop-up picture (typically smaller) than with the audio track.

Picture Security

One of the best ways to sell on the Internet is by using high quality pictures. These pictures often take a great deal of effort to create. Unfortunately, once the pictures are on the Internet they are easy to copy and use. There are no good methods to protect pictures. In one embodiment of the invention, the pictures are transformed to video to facilitate protection. There are many video formats that support DRM (Digital Rights Management) which provides the protection of the pictures that the user worked hard to create. In one embodiment of the invention WMV with its DRM system is used for picture protection.

The present invention includes a number of features:

1. Picture to video editing that uses the original pictures and audio tracks in the editing process.
2. (1) when two players are used for the editing process.
3. (1) where the transcoding process is streamlined.
4. Making the video playing length a function of the audio track length.
5. (4) where time allocated to each picture is equal.
6. (4) where the time allocated to each picture is manually set by the user.
7. Using a telephone to create the audio track.
8. Using text to speech as a source for the sound track.
9. (8) where every picture has its own text and the duration of the time allocated to each picture is a function of the length of the speech resulting from the text.
10. (8) where automatic picture to video is created for multiple streamlined advertisements.
11. (10) directed specifically at aggregators.
12. (1) or in (10) that facilitates the insertion of external audio clips and music into the picture to video process.
13. Use of focal points to improve the quality of the video.
14. A picture to video method in conjunction with a video DRM to protect the pictures from illegal distribution.

Figure 2:
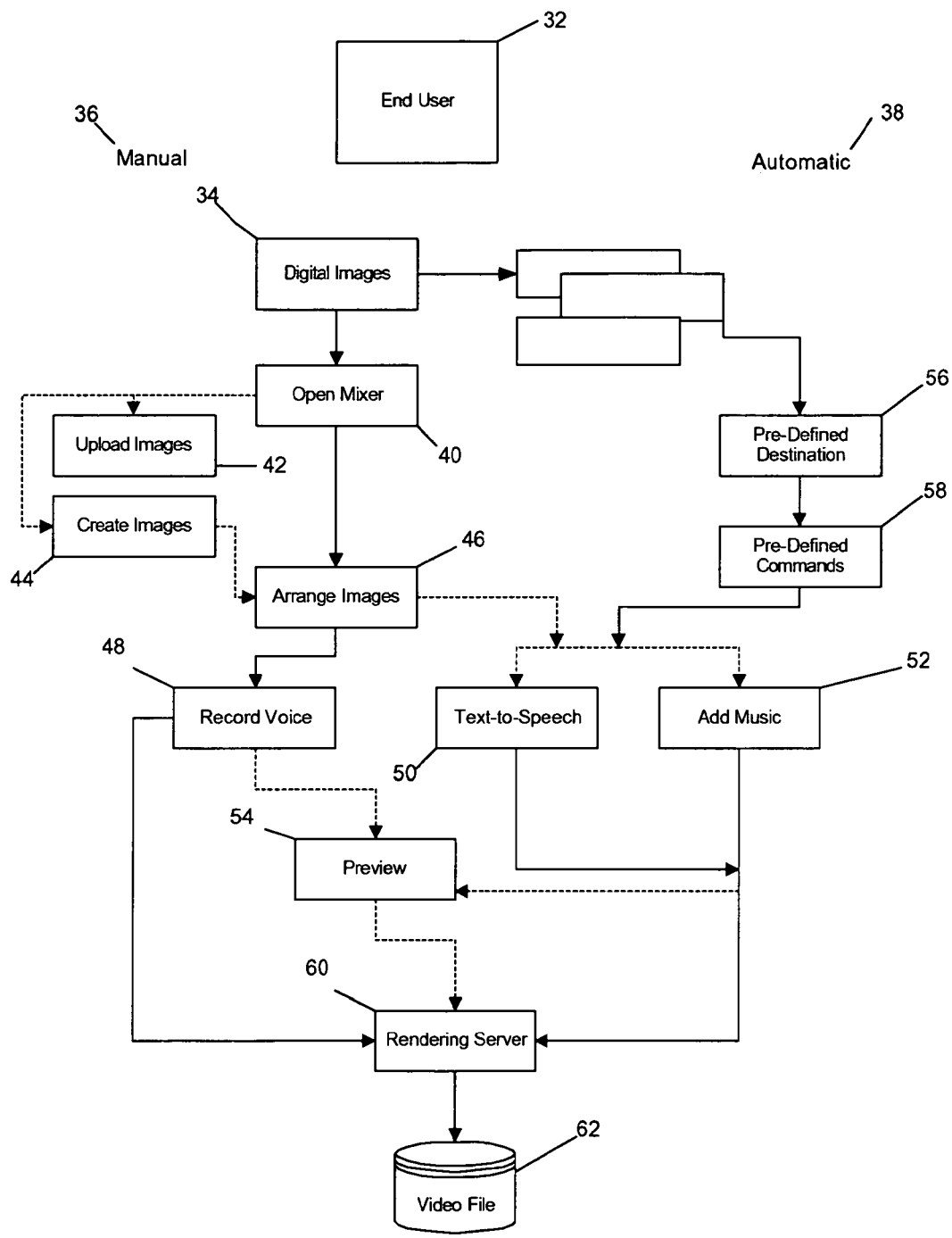
FIG. 2 depicts a more detailed system for creating a video clip in accordance with a preferred embodiment of the present invention.

Referring now to FIG. 2, a more detailed system 30 of the present invention includes a user device 32, which may be a wired or wireless device, is adapted to send pictures 34 via a manual process 36 or an automated process 38. If a manual process 36 is used, the pictures 40 are received by a mixer 40, the pictures are uploaded 42 to a web server, and can be created 44 and arranged 46 or ordered, panned, or zoomed, via a GUI accessible by the user device 32. A voice can be recorded via an IVR recording 48 or a TTS application 50, and music can be added 52 via a music interface. The audio and video can then be previewed 54. If the automated process 38 is used, a pre-defined destination 56 and pre-defined commands 58 would perform the uploading, creating, editing, etc. that was previously described in the manual process. Audio and music can also be added via the TTS application 50 and the music interface 52, respectively. In either process 36, 38, a rendering server 60 provides a rendering process that is further described in FIG. 5 which results in a video clip that can be stored 62.

Referring now to FIG. 3, a synchronization process 70 of the present invention is depicted. The process includes retrieving a URL for a first player 72, setting the first player to the retrieved URL (first URL) 74, retrieving a URL for a second player 76, setting the second player to the retrieved URL (second URL) 78, starting a timer process 80 (that is more fully described in FIG. 4), and signaling the first player to begin playing 82. This process can be used to preview pictures in one media player and audio in another player or both media and audio in one player with the pictures and the audio synchronized.

Referring now to FIG. 4, a timer process 90 of the present invention is depicted. The process includes determining 92 if a first player is playing streamed data. If it is not, the process proceeds to step 94 where a period of time (typically milliseconds) is elapsed before the determining 92 occurs again. If the player is playing the streamed data, signaling 96 a second player to begin playing.

Referring now to FIG. 5, a timer process 100 of the present invention is depicted. The process includes retrieving a dataset (SIS Commands) for the unique picture to video (or multi-media production) identifier 102, converting the dataset to an XTL file 104, invoking a rendering engine and providing the XTL file, an output path, a file name, a file type, and an encoding profile 106, and storing the resulting output file 108.

Figure 6:
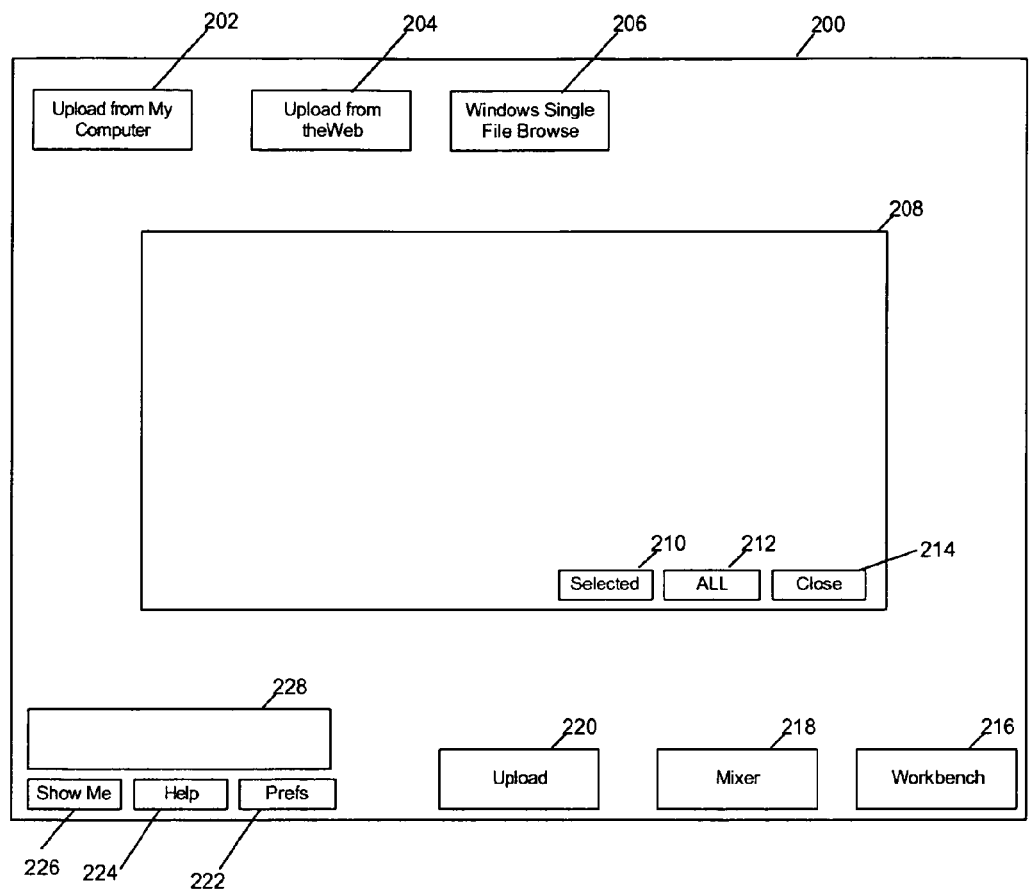
FIG. 6 depicts a user interface for management of uploading images into the system in accordance with a preferred embodiment of the present invention.

Referring now to FIG. 6 a user interface for management of uploading images 200 into the system is depicted. The reference numerals in the figure include: 202 which is a UI Button that opens another interface (240) to select images from the user's computer to upload, 204 which is a UI Button that opens another interface to select images from a web site for upload into the system, 206 which is a UI Button that opens another simpler interface (260) to allow the user to select images to upload, 208 which is the image "wallet" where all the uploaded images are displayed, 210 which is a UI Button that moves selected clips from the wallet to the storyboard (288), 212 which is a UI Button that moves all clips from the wallet to the storyboard (288), 214 which is a UI Button that closes the "wallet" window, 216 which is a UI Button that loads the "Workbench" UI (420), 218 which is a UI Button that loads the "Mixer" UI (280), 220 which is a UI Button that loads the "Upload Management" UI (200), 222 which is a UI Button that allows the user to manage their application preferences, 224 which is a UI Button that displays "Help Topics" in a text view, 226 which is a UI Button that displays a video tutorial about the process, and 228 which is an area for display of textual messages to the user.

Figure 7:
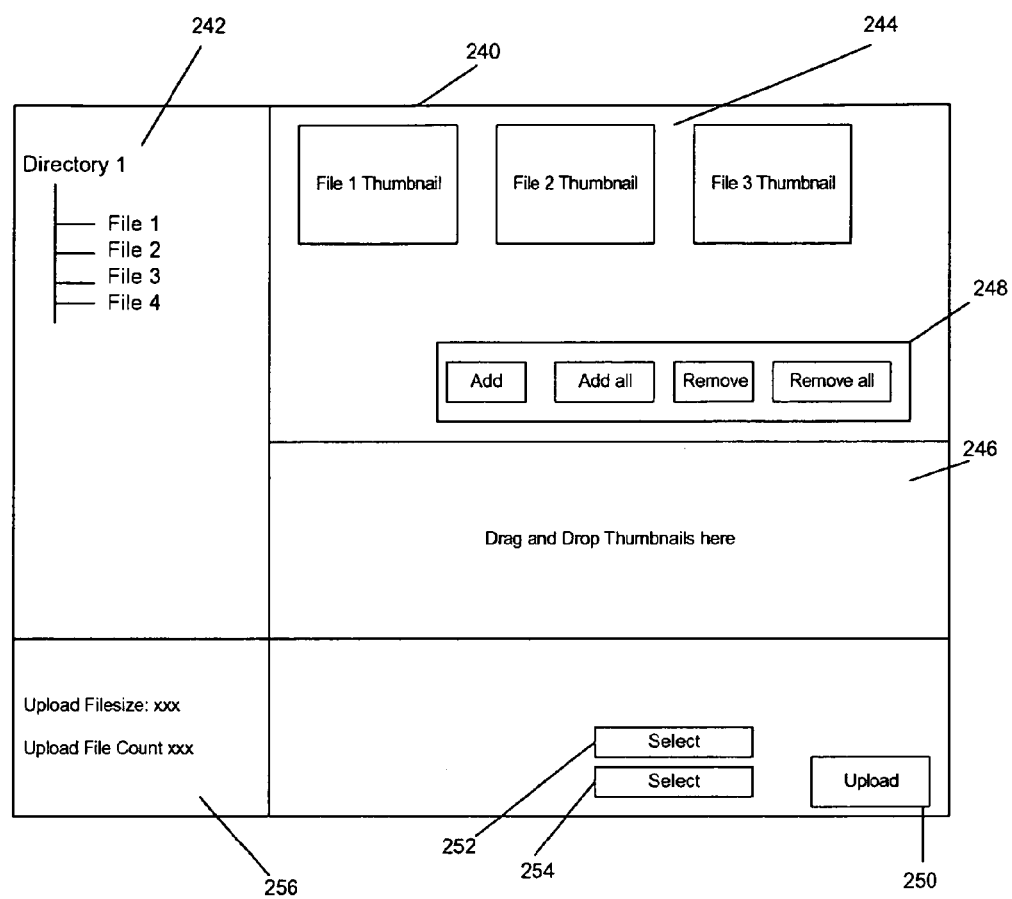
FIG. 7 depicts a user interface for uploading images from a user's computer into the system in accordance with a preferred embodiment of the present invention.

Referring now to FIG. 7 a user interface for uploading images from a user's computer 240 into the system is depicted. The reference numerals in the figure include: 242 which is a file directory listing of the end user's computer, 244 which is a thumbnail display area of images on the end user's computer, 246 which is a thumbnail display area of images selected to be uploaded into the system, 248 which is a set of UI Buttons to manage selected images being displayed in 246, 250 which is a UI Button to start the upload process, 252 which is a UI Button to select how the images are displayed in 244, 254 which is a UI Button to select how the images are displayed in FIGS. 246, and 256 which is a set of display graphics detailing the number and size of currently uploaded file.

Figure 8:
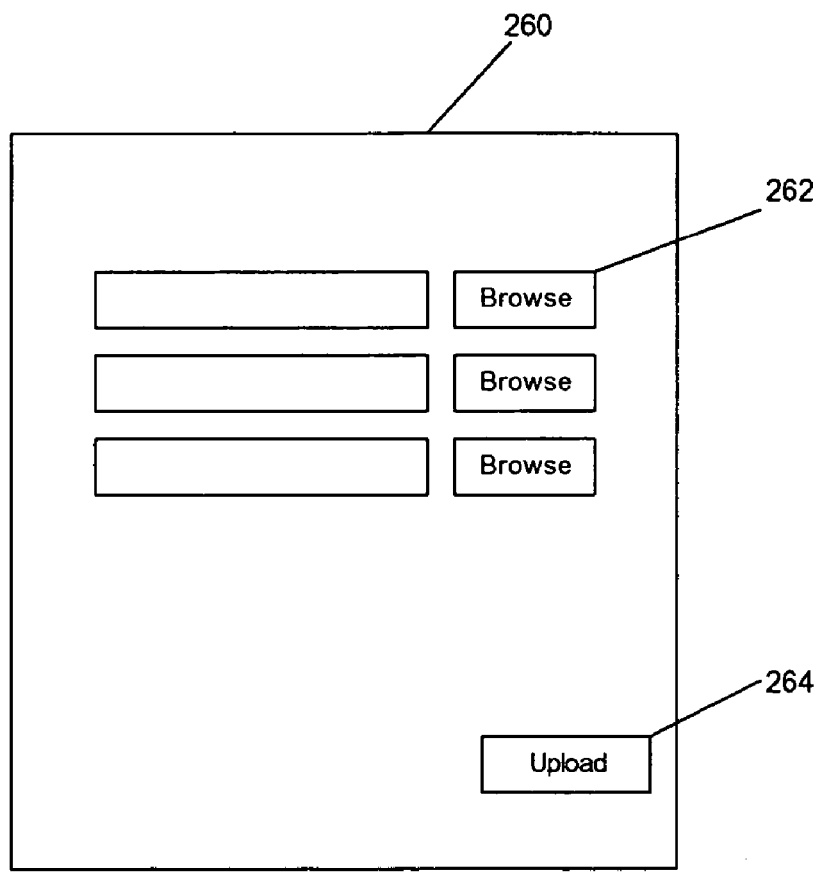
FIG. 8 depicts a simpler user interface to upload images into the system in accordance with a preferred embodiment of the present invention.

Referring now to FIG. 8 a simpler user interface to upload images 260 into the system is depicted. The reference numerals in the figure include: 262 which is a UI Button to open an image selection dialogue, and 264 which is a UI Button to start the upload process.

Figure 9:
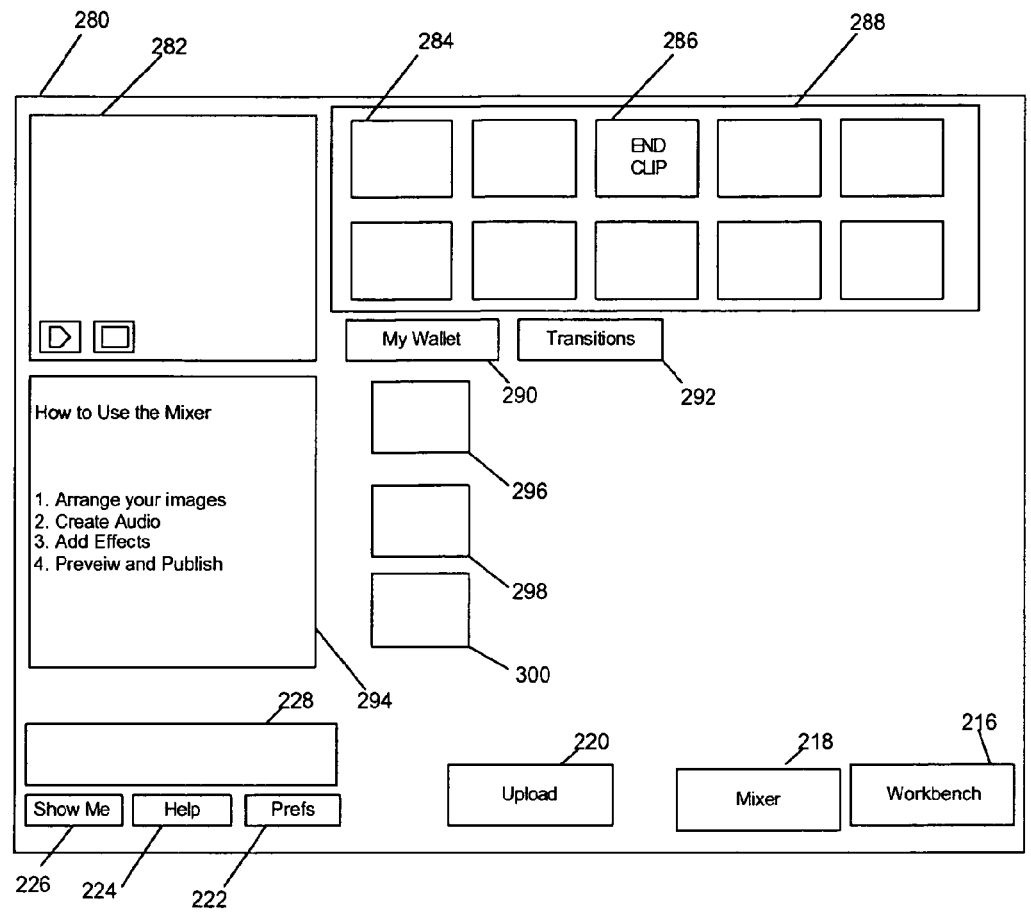
FIG. 9 depicts a "mixer" user interface where an end user can assemble a video production in accordance with a preferred embodiment of the present invention.

Referring now to FIG. 9 a "mixer" user interface where an end user can assemble a video production 280 is depicted. The reference numerals in the figure include: 282 which is a Media Player to play the video production, 284 which is a thumbnail image that represents the original image's sequence in the video, 286 which is the "End Clip" marker (which designates the end of the video production), 288 which is the Storyboard where the end user interacts with the thumbnail images, 290 which is a UI button that opens the image "wallet" (208), 292 which is a UI button that open the Video Transition Chooser Interface (310), 294 which is a text based help menu system, 296 which is a UI button that opens the voice recording interface (400), 298 which is a UI button that opens the female voice text-to-speech input interface, and 300 which is a UI button that opens the male voice text-to-speech input interface (390).

Figure 10:
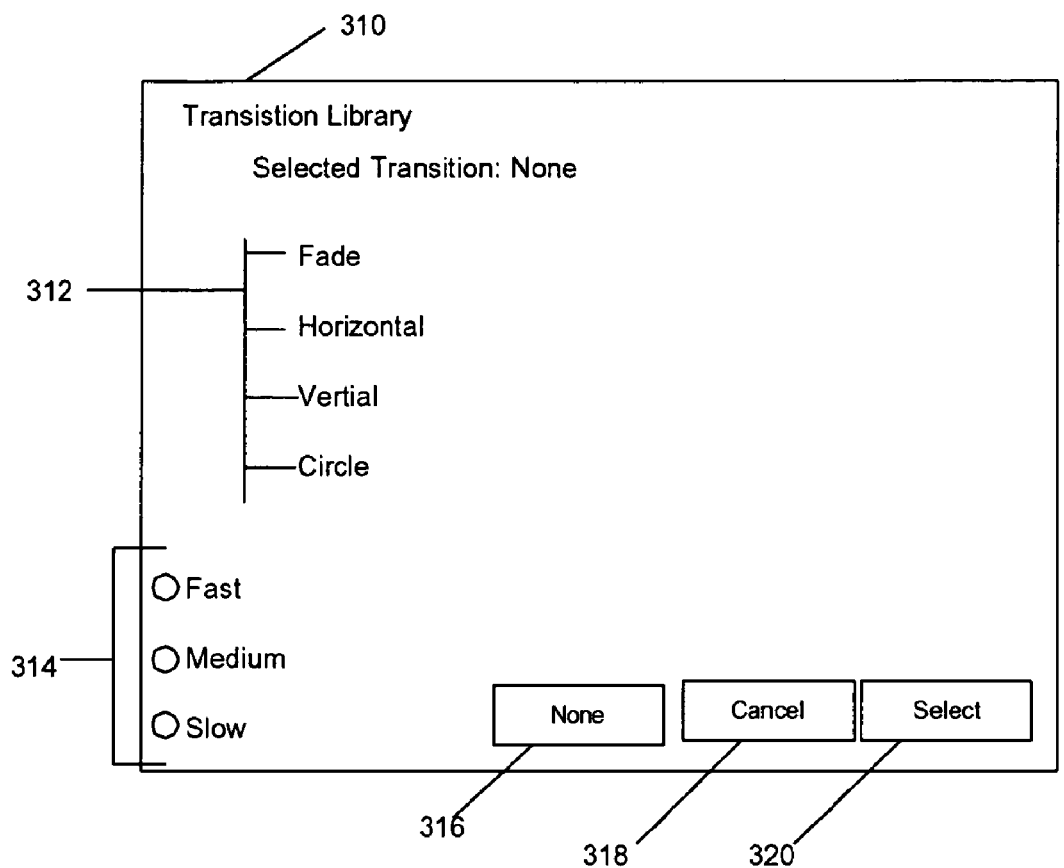
FIG. 10 depicts a video transition chooser interface in accordance with a preferred embodiment of the present invention.

Referring now to FIG. 10 a video transition chooser interface 310 is depicted. The reference numerals in the figure include: 312 which is a listing of available video transitions to choose from, 314 which is a listing of available transition speeds to choose from, 316 which is a UI button to disable use of video transitions, 318 which is a UI button to close the current window without saving any choices made by the end user, and 320 which is a UI button to accept the currently selected transition type and speed.

Figure 11:
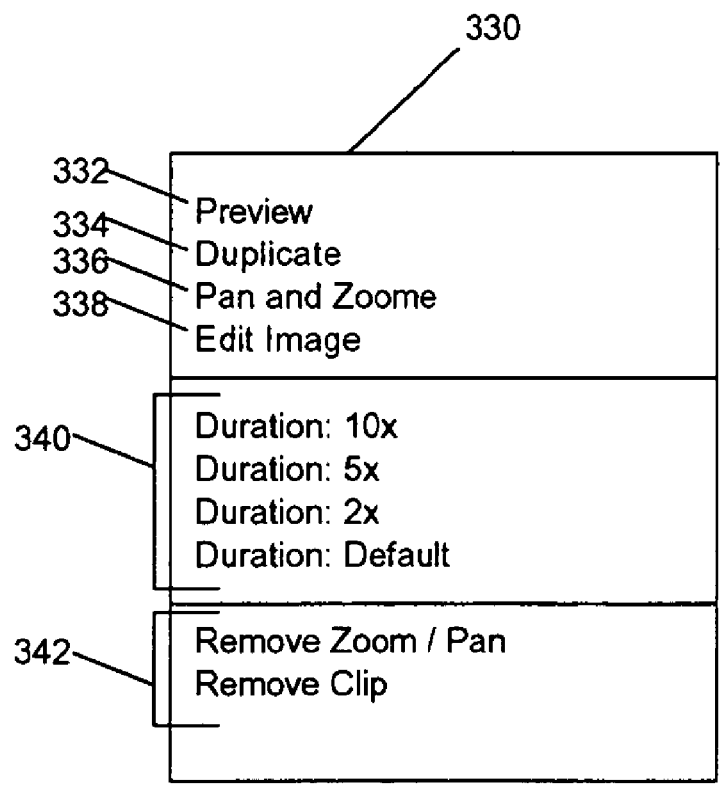
FIG. 11 depicts a click or context menu that is displayed when a user clicks on a thumbnail image in accordance with a preferred embodiment of the present invention.

Referring now to FIG. 11 a click or context menu that is displayed when a user clicks on a thumbnail image 330 is depicted. The reference numerals in the figure include: 332 which is a UI button that displays a preview of the image, 334 which is a UI button the creates a duplicate of the current image, 336 which is a UI button that opens the "Pan and Zoom" interface window (350), 338 which is a UI button that opens the "Crop Image" interface window (370), 340 which is a set of UI buttons that set the duration of the current image, and 342 which is a set of UI buttons to remove special effects that have been added to the image.

Figure 12:
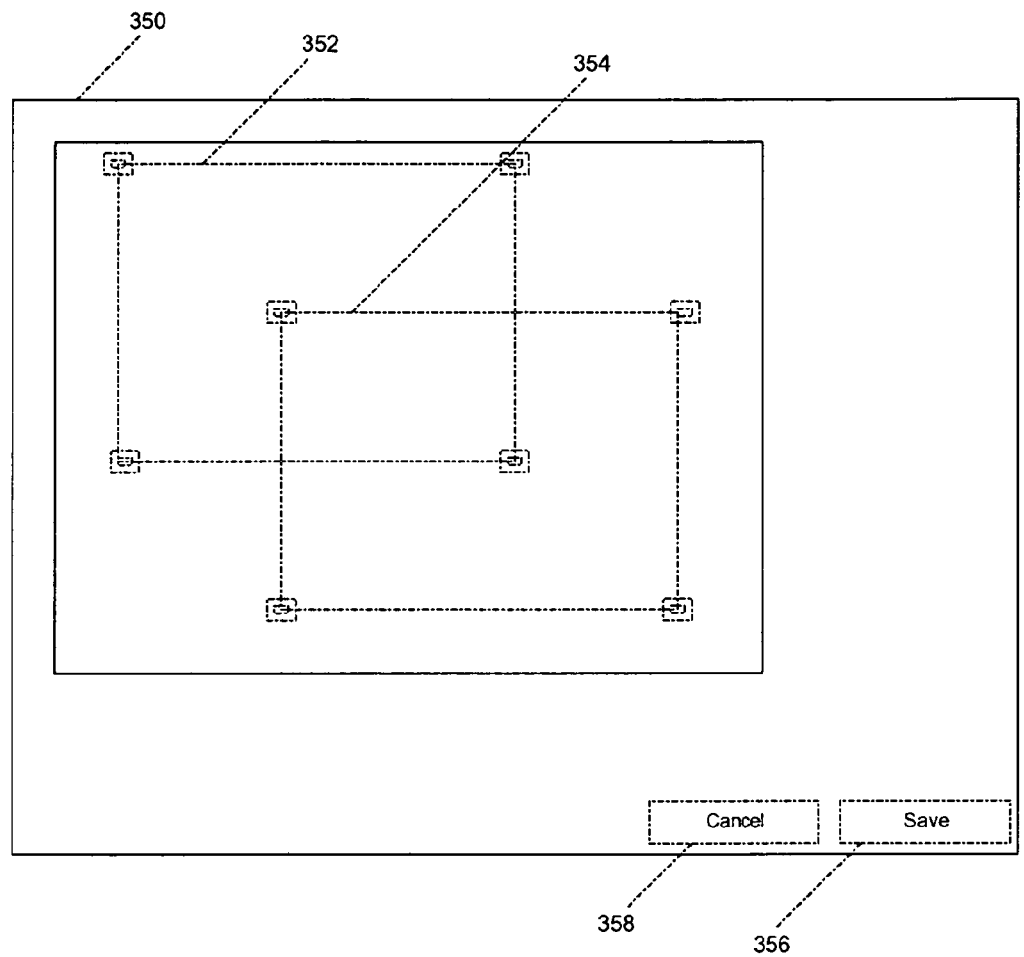
FIG. 12 depicts a "Pan and Zoom" interface window in accordance with a preferred embodiment of the present invention.

Referring now to FIG. 12 a "Pan and Zoom" interface window 350 is depicted. The end user makes a selection for the beginning viewport (352) and the end viewport (354). These selections will create simulated motion in the end video by morphing the image from the beginning viewport to the end viewport. The reference numerals in the figure include: 356 which is the UI button that saves the changes made to the "Pan and Zoom" options, and 358 which is the UI button to cancel any changes made and close the current window.

Figure 13:
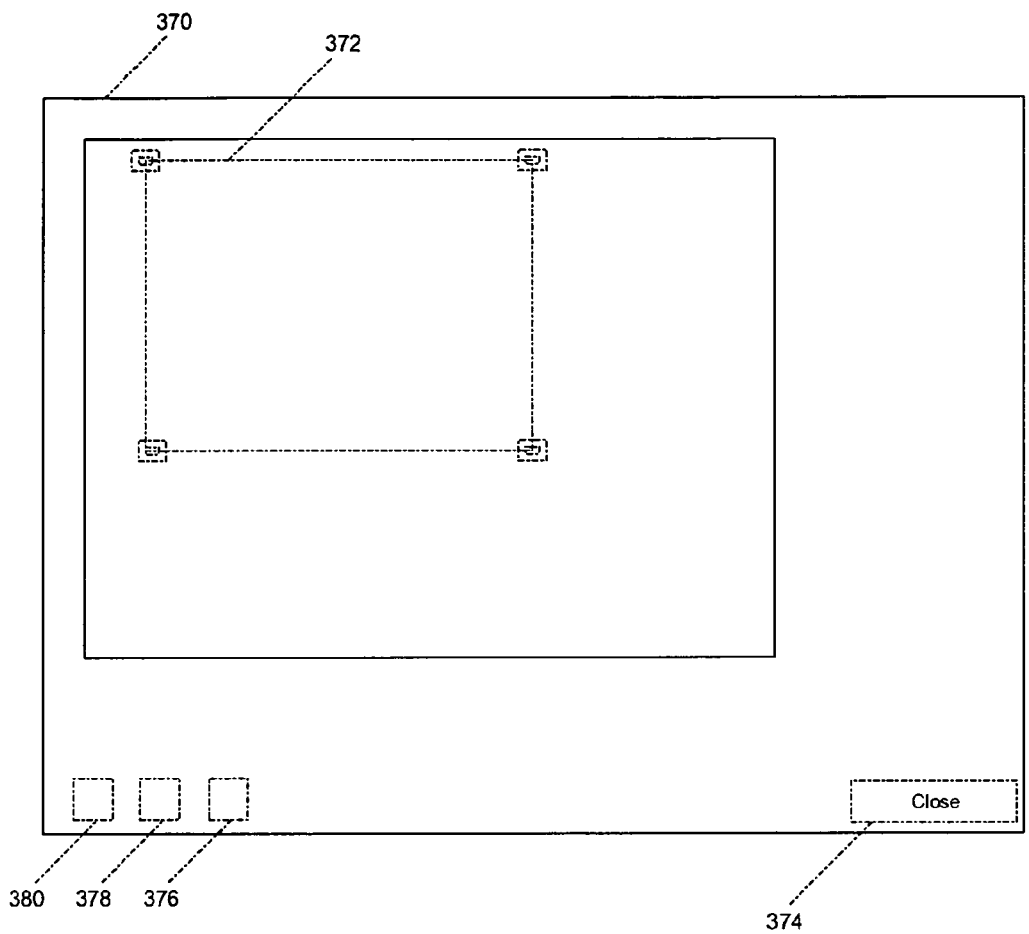
FIG. 13 depicts a "Crop Image" interface window in accordance with a preferred embodiment of the present invention.

Referring now to FIG. 13 a "Crop Image" interface window 370 is depicted, which allows for a user to select a portion of the original image using the selection box (372) and save the new image. The reference numerals in the figure include: 374 which is a UI button to close the current interface window, 376 which is a UI button to save the current "cropped" image as a new image, 378 which is a UI button to zoom into the current viewport, and 380 which is a UI button to preview the cropped image.

Figure 14:
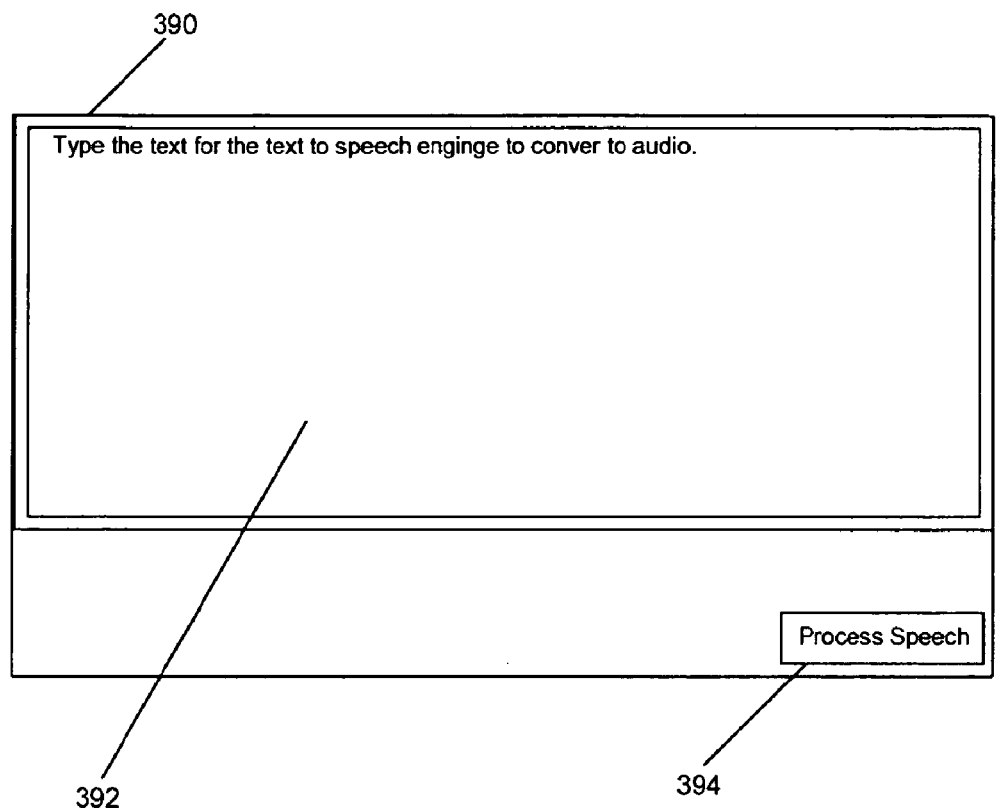
FIG. 14 depicts a male voice text-to-speech input interface in accordance with a preferred embodiment of the present invention.

Referring now to FIG. 14 a male voice text-to-speech input interface 390 is depicted. The reference numerals in the figure include: 390 which is the male voice text-to-speech input interface. This interface allows the end user to type text into the window (392) and have that text processed into audio by pressing the process speech UI button (394).

Figure 15:
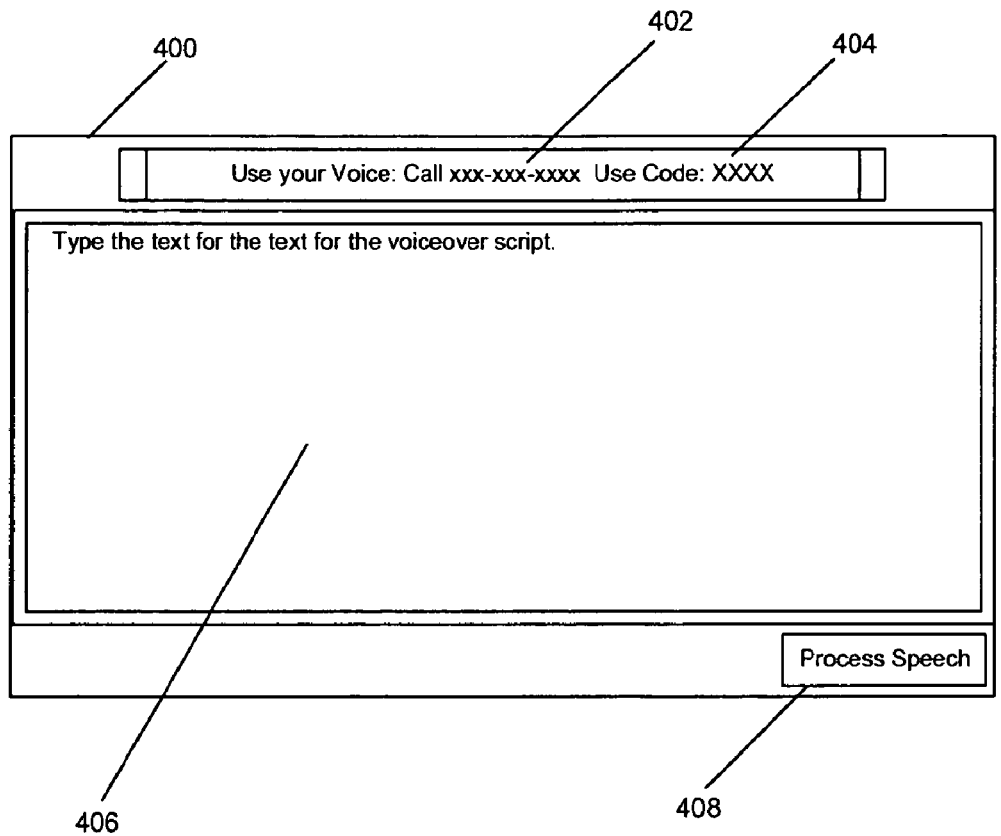
FIG. 15 depicts a voice recording interface window in accordance with a preferred embodiment of the present invention.

Referring now to FIG. 15 a voice recording interface window 400 is depicted, which allows the user to type a script into the window (406) to be recited during a recording. The reference numerals in the figure include: 402 which is a display area for the telephone number to call to make the voice recording, 404 which is a display area for the code number that is inputted into the voice recording system, and 408 which is a UI button to preview the recorded audio.

Figure 16:
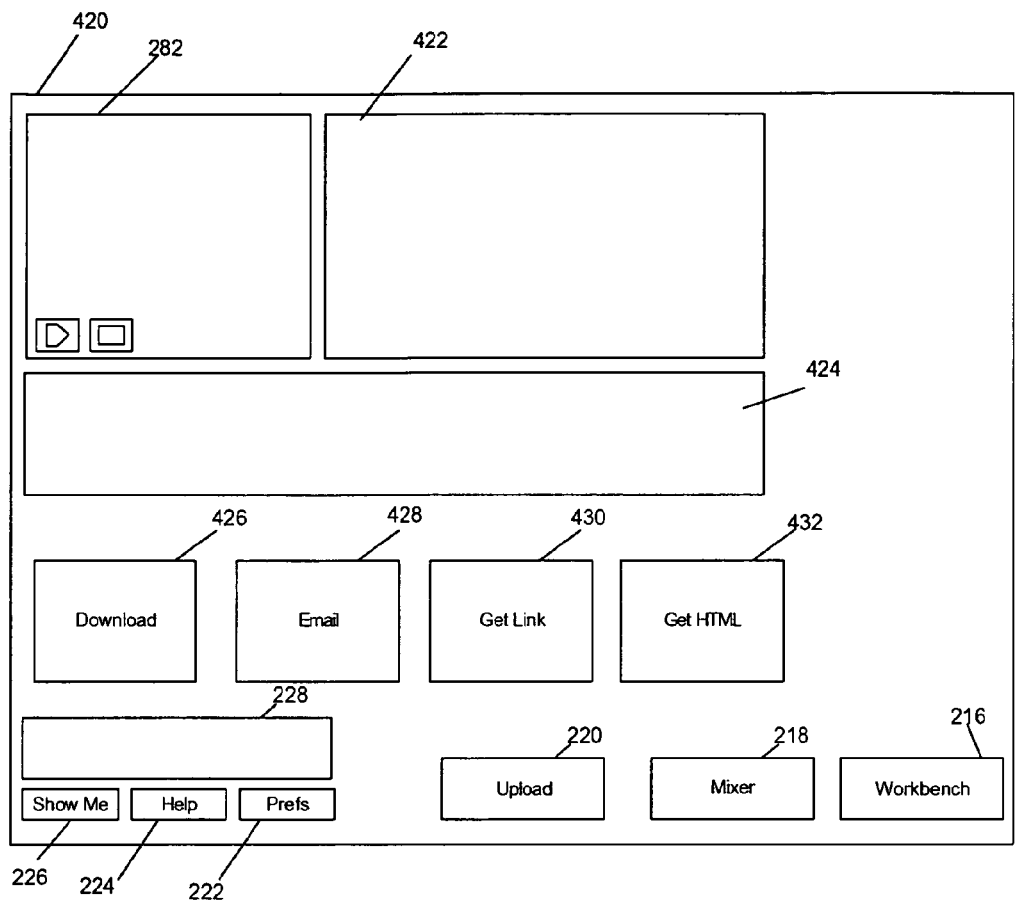
FIG. 16 depicts a "Workbench" user interface window in accordance with a preferred embodiment of the present invention.

Referring now to FIG. 16 a "Workbench" user interface window 420 is depicted. The reference numerals in the figure include: 422 which is a display area for the title and description of the video, 424 which is a display area for textual information and help, 426 which is a UI button that triggers a download of the final video to the end user, 428 which is a UI button that allows the end user to send the video link via e-mail, 430 which is a UI button that allows the end user to view the video link, and 432 which is the UI button that allows the end user to download HTML code to display the video from within a HTML page.

In one embodiment of the present invention, a method for creating a video clip comprises receiving still image files by a first module, creating a copy of a still image from the still image files with reduced dimensions (such as a thumb nail) by the first module, creating a new still image from a selected area of the still image (i.e. cropping), storing the new still image and the copy of the still image with a unified file name (UFN), ordering the stored images, creating an audio file by at least one of a second module and a third module, creating a timeline, by the first module, related to the ordered images and the created audio, and rendering the timeline into the video clip by a fourth module.

The method further comprises storing at least one of: metadata related to the still image and the copy of the still image, metadata related to the audio file, the timeline, and information comprising the creating of the audio file (for example, if a user uses TTS, then the information that is stored is the text used to generate the audio. If the user uses a phone number, then the information that is stored is the dialed number, the calling number, a record number or a code number of the IVR application), transitioning from one to another one of the ordered images, and further comprising storing a transition identifier and a transition length, and retrieving at least one of: the metadata related to the audio file, the metadata related to the still image and the copy of the still image, the timeline, and the information comprising the creating of the audio file, the by the first module, wherein the metadata is stored in a command (such as a SIS Command), wherein the metadata stores at least one of: a height, a width, a size, compression data, and a file format.

The method also comprises panning and zooming at least one of: a portion of or the copy of the still image, a portion of or the new created still image, a portion of or the stored new still image, and a portion of or the stored copy of the still image, wherein the panning and the zooming is a set of coordinates related to the image, wherein the copy of the still image is used for display purposes (i.e. a thumbnail), wherein the new created still image is displayed as an image with reduced dimension, wherein the set of coordinates is stored in the timeline. The method further comprises optionally previewing the timeline via a fifth module, wherein the timeline includes at least one of: a length of the audio file, a length of the video clip, the order of the images, a display time of each of the images, transition identifiers, transition lengths, panning and zooming coordinates, an identifier of the audio file created by the second module or the third module, and a volume envelope (which includes "volume points" that are the volume and the time that the volume occurs) associated with the created audio file.

In another embodiment of the present invention, a system for creating a video clip comprises a web server adapted to receive one or more images, the web server adapted to create a copy of the images, the web server adapted to create one or more new images from one or more selected areas of the images, and the web server adapted to provide a unified file name to each of the new images and a unified file name to each of the copies of the images, wherein the copy of the still images is created with reduced dimensions.

The system further comprises memory adapted to store at least one of: the new image, the copy of the image, the new image provided with the unified file name, the copy of the image provided with the unified file name, wherein the memory is coupled to the web server, a device coupled to the web server, wherein the device is adapted to order at least one of: the received images, the copy of the images, the new images, the stored images, and the ordered images, a text-to-speech module, and an integrated voice response module, wherein at least one of the modules is adapted to create an audio file, wherein at least one of the modules is coupled to at least one of the web server and the memory, wherein the web server is adapted to create a timeline related to the ordered images and the created audio file, wherein the timeline and the audio file are stored in the memory, and a rendering server adapted to render the timeline into the video clip.

In a further embodiment of the present invention, a computer readable medium comprises instructions for: creating a copy of an image with reduced dimensions, creating a new image from a selected area of the copied image, storing the new image and the copy of the image with a unified file name, and creating a timeline related to the image, the new image, and to audio related to the image and to the new image, wherein the timeline is used to create a video clip.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems 10 and 30 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

What is claimed is:

1. A method, comprising:
    receiving at a data processing system both a user-defined sequence for a plurality of still images and at least one of
        the plurality of still images, and
        information regarding the plurality of still images including a number of the still images and identifiers for the still images;
    receiving at the data processing system information from which a desired length of a video may be determined; and
    within the data processing system, automatically defining parameters for the video based on the user-defined sequence for the still images and the desired length of the video, the parameters including
        a length of the video when generated with at least a plurality of portions each corresponding to one of the still images in the user-defined sequence,
        identifiers each identifying a still image within the plurality of the still images for a portion of the video corresponding to the respective still image,
        transition information for transitions in the video to and from portions of the video corresponding to one of the still images, and
        at least one of panning and zooming coordinates for one or more of the still images used for a portion of the video.

2. The method of claim 1, further comprising:
    based on the defined parameters, automatically generating the video from the plurality of still images and audio.

3. The method of claim 2, wherein the audio comprises one of at least one audio file and audio generated by text-to-speech processing of user-defined text.

4. The method of claim 3, further comprising:
    determining a duration of audio corresponding to the user-defined text; and
    using the determined duration as the desired length of the video.

5. The method of claim 2, further comprising:
    when automatically defining parameters for the video, automatically defining parameters for at least one of panning and zooming portions of one or more of the still images.

6. The method of claim 2, wherein the transition information comprises at least one transition identifier and associated transition timing for transitioning within the video from a portion of the video corresponding to a first of the still images to a portion of the video corresponding to a second of the still images.

7. The method of claim 1, wherein the information from which the desired length of the video may be determined comprises one of at least one audio file and text for text-to-speech generation of at least a portion of an audio track for the video.

8. The method of claim 1, wherein the defined parameters for the video includes a timeline.

9. A system, comprising:
    storage configured to receive and to store both a user-defined sequence for a plurality of still images and at least one of
        the plurality of still images, and
        information regarding the plurality of still images including a number of the still images and identifiers for the still images,
    wherein the system is further configured to receive and to store information from which a desired length of a video may be determined; and
    a processing system configured to automatically define parameters for the video based on the user-defined sequence for the still images and the desired length of the video, the parameters including
        a length of the video when generated with at least a plurality of portions each corresponding to one of the still images in the user-defined sequence,
        identifiers each identifying a still image within the plurality of the still images for a portion of the video corresponding to the respective still image,
        transition information for transitions in the video to and from portions of the video corresponding to one of the still images, and
        at least one of panning and zooming coordinates for one or more of the still images used for a portion of the video.

10. The system of claim 9, further comprising:
    a server configured to automatically generate the video from the plurality of still images and audio based on the defined parameters.

11. The system of claim 10, wherein the audio comprises one of at least one audio file and audio generated by text-to-speech processing of user-defined text.

12. The system of claim 11, wherein the server is configured to:
    determine a duration of audio corresponding to the user-defined text, and use the determined duration as the desired length of the rendered video.

13. The system of claim 10, wherein the processor is configured, when automatically defining parameters for the video, to automatically define parameters for at least one of panning and zooming portions of one or more of the still images.

14. The system of claim 10, wherein the transition information comprises at least one transition identifier and associated transition timing for transitioning within the video from a portion of the video corresponding to a first of the still images to portion the video corresponding to a second of the still images.

15. The system of claim 9, wherein the information from which the desired length of the video may be determined comprises one of at least one audio file and text for text-to-speech generation of an audio track.

16. The system of claim 9, wherein the defined parameters for the video includes a timeline.

17. A method, comprising:
receiving at a first data processing system from a second data processing system both a user-defined sequence for a plurality of still images and user-defined text for audio to be generated by text-to-speech processing of the user-defined text, wherein each of the first and second data processing systems comprise at least one of a server and a processing program executing within a computer; and
in response to receiving the user-defined sequence and the user-defined text, automatically generating in the first data processing system a timing sequence for a video, the timing sequence corresponding to a duration of audio for the video generated by text-to-speech processing of the user-defined text and defining transitions within the video among portions of the video corresponding to each of the plurality of still images in the user-defined sequence, wherein at least one of the portions of the video corresponding to one of the still images at least one of pans and zooms the one of the still images.

18. The method of claim 17, further comprising:
transmitting the timing sequence from the first data processing system to the second data processing system for use by the second data processing system in generating a video based on the timing sequence, wherein the plurality of images are stored at the second data processing system.

19. The method of claim 17, further comprising:
defining, within the timing sequence, periods for the at least one of panning and zooming portions of at least the one of the still images.

20. The method of claim 17, further comprising:
generating audio in the first data processing system by text-to-speech processing of user-defined text; and
transmitting at least one audio file for the generated audio from the first data processing system to the second data processing system together with the timing sequence.

* * * * *